E. ERIKSEN.
RESILIENT TIRE.
APPLICATION FILED JAN. 23, 1917.
1,280,198.
Patented Oct. 1, 1918.
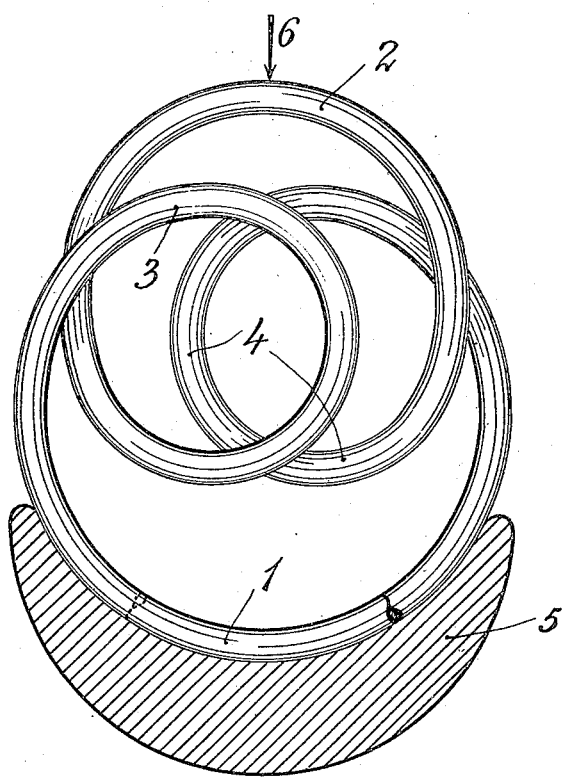
Inventor:
E. Eriksen
by
Attorney

UNITED STATES PATENT OFFICE.

ERLING ERIKSEN, OF NORDSTRAND, NORWAY.

RESILIENT TIRE.

1,280,198.   Specification of Letters Patent.   Patented Oct. 1, 1918.

Application filed January 23, 1917. Serial No. 144,100.

*To all whom it may concern:*

Be it known that I, ERLING ERIKSEN, a citizen of Norway, and resident of Nordstrand, Ostre Aker, Norway, have invented certain new and useful Improvements in Resilient Tires, of which the following is a specification.

The present invention has for its object to provide a resilient tire, which may be used on automobiles or other power-driven cars instead of the ordinary pneumatic tires.

The invention is illustrated in the accompanying drawing, which illustrates the manner in which the steel wire constituting the tire is coiled.

The steel wire is coiled to form a tight coil in such a manner that each turn comprises four loops. The two opposite loops —1— and —2— turn outward and the two other opposite loops —3— and —4—, lying between —1— and —2—, turn inward. Loop —1— of the main loops rests in the wheel rim 5, and the other main loop —2— turns outward against the road. The by-loops —3— and —4— turn inward into the approximately cylindrical space inclosed by the two main loops. The tightly wound steel wire coil thus formed may be uncovered as indicated in the drawing, or it may be arranged in a suitable cover.

On account of the by-loops —3— and —4— each coil turn obtains a substantial resiliency. A pressure acting in the direction of the arrow —6— against the outer main loop —2— tends to so alter the shape of the total coil turn, that it will become more flat and wide, consequently it tends to obtain a more elliptic shape. The same pressure, however, will also act upon the by-loops —3— and —4— so as to draw the latter, and hence the whole turn together laterally. The result therefore will be that the tire retains approximately its outer shape, the main loops —1— and —2— becoming somewhat smaller and the by-loops somewhat larger.

The tire in this manner possesses a suitable degree of stiffness, and at the same time the steel wire is subjected to a very uniform stress at all points.

Having now described my invention, what I claim as new and desire to secure by Letters Patent is:

1. A resilient tire consisting of a continuous wire coil, each turn of which has an inner loop to fit into the rim of a wheel, a relatively smaller outer loop opposite said inner loop, and two oppositely disposed inwardly turned loops between said first named loops.

2. A resilient tire consisting of a continuous wire coil, each turn of which has an inner loop to fit into the rim of a wheel, an outer loop opposite said inner loop, and two oppositely disposed inwardly turned loops between said first named loops, the centers of said inwardly turned loops being spaced apart transversely of the tire.

3. A resilient tire consisting of a continuous wire coil each turn of which has an inner loop to fit into the rim of a wheel, a relatively smaller outer loop opposite said inner loop, and two oppositely disposed inwardly turned loops between said first named loops, the centers of said inwardly turned loops being spaced apart transversely of the tire.

4. A resilient tire consisting of a continuous wire coil each turn of which comprises an inner substantially semi-circular loop, an outer substantially semi-circular loop of smaller radius than the inner loop, and substantially circular inwardly directed loops joining the adjacent ends of said inner and outer loops, the inwardly directed loops partially but not wholly overlapping.

Signed at Christiania, Norway, this twenty third day of December, A. D. 1916.

ERLING ERIKSEN.

Witnesses:
 ALEX ZAHN,
 MAGIUS BUGGE.

Copies of this patent may be obtained for five cents each, by addressing the "Commissioner of Patents, Washington, D. C."